(12) United States Patent
Misraa et al.

(10) Patent No.: US 11,816,181 B2
(45) Date of Patent: Nov. 14, 2023

(54) BLUR CLASSIFICATION AND BLUR MAP ESTIMATION

(71) Applicant: ADOBE INC., San Jose, CA (US)

(72) Inventors: Aashish Misraa, San Jose, CA (US); Zhe Lin, Bellevue, WA (US)

(73) Assignee: ADOBE, INC., San Jose, CA (US)

( * ) Notice: Subject to any disclaimer, the term of this patent is extended or adjusted under 35 U.S.C. 154(b) by 303 days.

(21) Appl. No.: 17/190,197

(22) Filed: Mar. 2, 2021

(65) Prior Publication Data

US 2022/0284236 A1 Sep. 8, 2022

(51) Int. Cl.
*G06V 10/774* (2022.01)
*G06F 18/214* (2023.01)
*G06T 7/00* (2017.01)
*G06F 18/241* (2023.01)
*G06V 10/82* (2022.01)
*G06V 10/70* (2022.01)

(52) U.S. Cl.
CPC ......... *G06F 18/214* (2023.01); *G06F 18/241* (2023.01); *G06T 7/0002* (2013.01); *G06V 10/774* (2022.01); *G06V 10/82* (2022.01); *G06V 10/87* (2022.01); *G06T 2207/20081* (2013.01); *G06T 2207/30168* (2013.01)

(58) Field of Classification Search
CPC .............................. G06V 10/82; G06V 10/87
USPC ........................................................ 382/159
See application file for complete search history.

(56) References Cited

U.S. PATENT DOCUMENTS

| 2013/0129233 A1* | 5/2013 | Schiller | G06F 18/24155 |
| | | | 382/228 |
| 2020/0082535 A1* | 3/2020 | Lindskog | G06V 40/161 |
| 2022/0210435 A1* | 6/2022 | Kang | H04N 19/196 |
| 2022/0277435 A1* | 9/2022 | Muthusamy | G06V 30/41 |

FOREIGN PATENT DOCUMENTS

WO WO-2021003821 A1 * 1/2021 ............... G06N 3/04

OTHER PUBLICATIONS

English Translation of WO2021/003821 A1, "Hou et al., Jan. 14, 2021" (Year: 2021).*
1Zhang, et al., "Learning to Understand Image Blur", In Proceedings of the IEEE Conference on Computer Vision and Pattern Recognition, pp. 6586-6595, 2018.

* cited by examiner

*Primary Examiner* — Ayodeji O Ayotunde
(74) *Attorney, Agent, or Firm* — F. CHAU & ASSOCIATES, LLC

(57) ABSTRACT

Systems and methods for image processing are described. Embodiments identify a training set including a first image that includes a ground truth blur classification and second image that includes a ground truth blur map, generate a first embedded representation of the first image and a second embedded representation of the second image using an image encoder, predict a blur classification of the first image based on the first embedded representation using a classification layer, predict a blur map of the second image based on the second embedded representation using a map decoder, compute a classification loss based on the predicted blur classification and the ground truth blur classification, train the image encoder and the classification layer based on the classification loss, compute a map loss based on the blur map and the ground truth blur map, and train the image encoder and the map decoder.

20 Claims, 11 Drawing Sheets

BLUR CLASSIFICATION AND BLUR MAP ESTIMATION

BACKGROUND

The following relates generally to image processing, and more specifically to blur classification.

Digital image processing refers to the use of a computer to edit a digital image using an algorithm or processing network. In some examples, an image is processed using image editing software. One common use for image editing software is to identify and edit images having undesired blurry portions, such as out-of-focus photographs taken using a mobile electronic device. With the wide availability of cameras in smart phones and other mobile electronic devices, many people capture and edit photographs having blurry portions. However, in some cases, certain blurry portions are intended and should be preserved (e.g., high-resolution professional photos applying long exposure or with depth-of-field effect).

Conventional image processing systems focus on local blur detection, and rely on users to determine the blur category (e.g., desired blur or undesired blur). Cues and hand-crafted features have been used to estimate the blur amount. In some examples, convolutional neural networks (CNN) are also used to increase the accuracy of blur estimation.

However, these image processing systems do not estimate or indicate whether the detected blur is desired or not desired in terms of image quality as a whole. Therefore, there is a need in the art for an improved image editing system that is efficient in understanding blur desirability.

SUMMARY

The present disclosure describes systems and methods for image processing. One or more embodiments of the disclosure provide a blur classification apparatus trained using machine learning techniques to determine whether a blurred portion is desired. In some embodiments, the blur classification apparatus is trained to predict a blur classification of an image along with a blur map estimation. The data for training the machine learning model may include examples that include a blur map, desirability information, or both. In some cases, different training batches have different annotation information. Accordingly, a map decoder of the network model may be frozen during training when a training batch does not include ground truth blur map information, and a classifier may be frozen when the training batch does not include blur classification information.

A method, apparatus, and non-transitory computer readable medium for training a machine learning model are described. One or more embodiments of the method, apparatus, and non-transitory computer readable medium include identifying a training set comprising a first image that includes a ground truth blur classification and second image that includes a ground truth blur map, generating a first embedded representation of the first image and a second embedded representation of the second image using an image encoder, predicting a blur classification of the first image based on the first embedded representation using a classification layer, predicting a blur map of the second image based on the second embedded representation using a map decoder, computing a classification loss based on the predicted blur classification and the ground truth blur classification, training the image encoder and the classification layer based on the classification loss, computing a map loss based on the blur map and the ground truth blur map, and training the image encoder and the map decoder based on the map loss.

An apparatus and method for image processing are described. One or more embodiments of the apparatus and method include an image encoder configured to generate an embedded representation of an image, a classification layer configured to predict a blur classification of the image based on the embedded representation, wherein the image encoder and the classification layer are trained based on a classification loss, and a map decoder configured to predict a blur map of the image based on the embedded representation, wherein the image encoder and the map decoder are trained based on a map loss.

A method, apparatus, and non-transitory computer readable medium for image processing are described. One or more embodiments of the method, apparatus, and non-transitory computer readable medium include receiving an image comprising a plurality of regions having different blur levels, generating an embedded representation of the image using an image encoder, predicting a blur classification of the image based on the embedded representation using a classification layer, wherein the image encoder and the classification layer are trained based on a classification loss, and predicting a blur map of the image based on the embedded representation using a map decoder, wherein the image encoder and the map decoder are trained based on a map loss.

DETAILED DESCRIPTION

Figure 1:
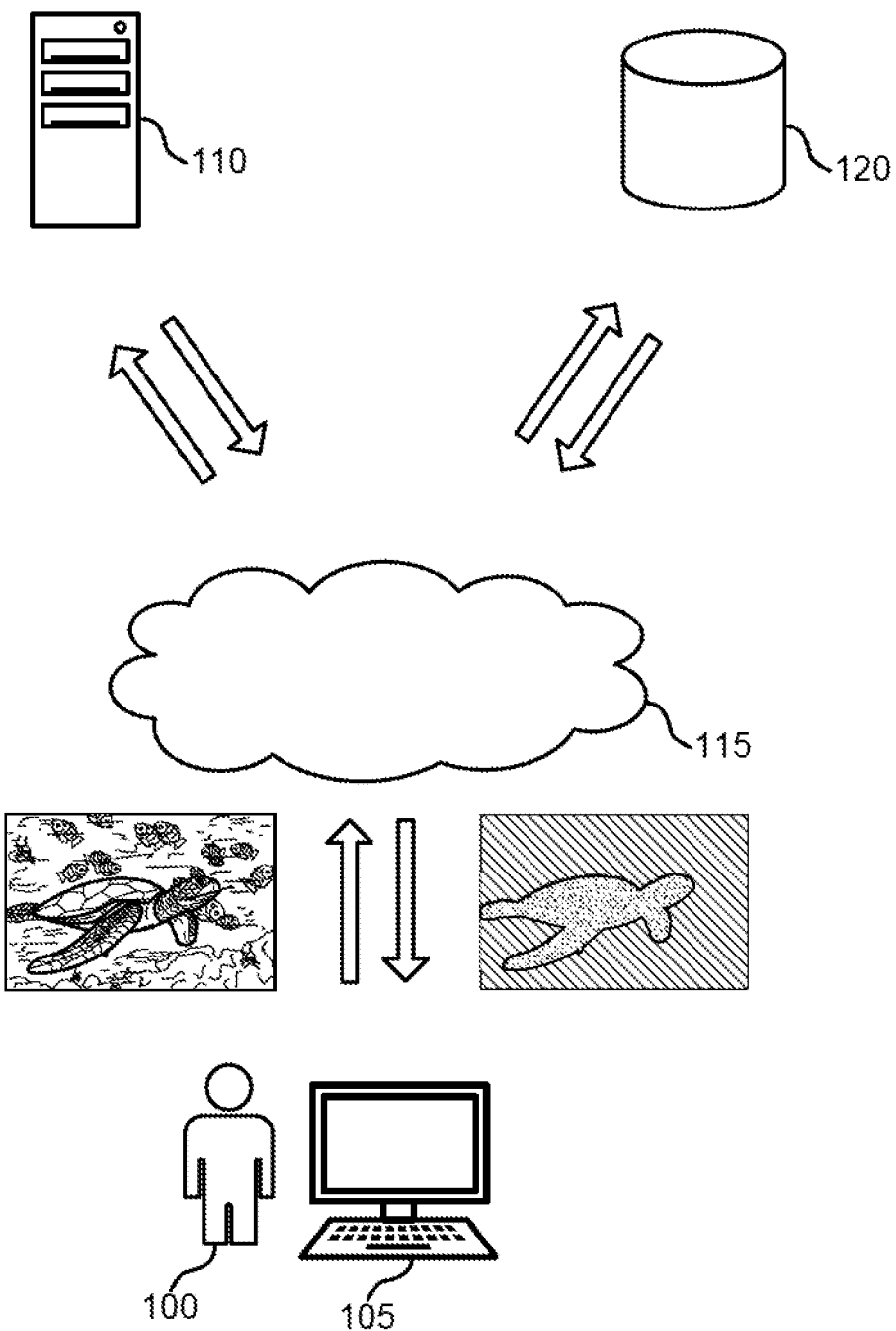
FIG. 1 shows an example of a system for image processing according to aspects of the present disclosure.

The present disclosure relates to image processing. One or more embodiments of the disclosure provide a blur classification apparatus trained to determine whether blurred portions of an image are desired or not (i.e., blur classification). In some embodiments, the blur classification apparatus is trained to predict blur classification together with a blur map. The data for training the machine learning model may include examples that include a blur map, desirability information, or both. In some cases, different training batches have different annotation information. Accordingly, a map decoder of the network model may be frozen during training when a training batch does not include ground truth blur map information, and a classifier or classification layer may be frozen when the training batch does not include blur classification information. An image encoder may be trained using all of the available training data.

Conventional image processing systems (i.e., image editing software) have focused on local blur detection, while relying on the blur category (desired blur or undesired blur). Multiple cues and hand-crafted features may be used to estimate blur amount, such as image gradients, local filters, sparse representation, local binary patterns, and relevance to similar neighboring regions. However, hand-crafted features are not robust to various conditions and lack of semantic information. For example, high quality photographs may include desirable blurred portions, while low quality photographs may include undesirable blurred portions. Conventional systems suffer from low prediction accuracy, and often misclassify good depth-of-field effects as undesired defects.

One or more embodiments of the present disclosure provide an improved blur classification apparatus that can determine blur classification using a wide range of image quality. Some embodiments classify an image in terms of image-level blur and also detect spatially-varying blur at the pixel-level. In some examples, a blur classification network includes a deep neural network that applies a multi-task, multi-dataset approach to solve for blur understanding in an image. Accordingly, the blur classification network can be trained using more data, which increases prediction accuracy.

By applying the unconventional step of freezing the map decoder or the classification layer of the network based on pre-determined criteria relating to the training data, one or more embodiments of the present disclosure provide a blur classification network that is less computationally expensive and less time consuming. The improved network is efficient and scalable to large datasets. Thus, an end-to-end joint training approach may be used for both blur map estimation and image blur classification. A multi-task setup (i.e., simultaneously performing the classification task and the mapping task) enables each task to piggyback on other task's training to facilitate learning better representations at the encoder level thereby achieving improved performance.

Embodiments of the present disclosure may be used in the context of image editing. For example, a blur classification network based on the present disclosure may be used to identify images with defects (e.g., for cropping undesired blurry areas). In some examples, a neural network identifies undesired images from a collection of images, and filter out the blurred images. Additionally, the network may be applied in image editing tools to add creative effects to the images. An example of an application of the inventive concept in the image editing context is provided with reference to FIGS. 1, 2 and 3. Examples of a process for predicting a blur classification and a blur map of an image are provided with reference to FIG. 4. Details regarding the architecture of an example blur classification apparatus are provided with reference to FIGS. 5, 6, and 7. Examples of a process for training a blur classification apparatus is described with reference to FIGS. 8, 9, 10, and 11.

Image Editing Application

FIG. 1 shows an example of a system for image processing according to aspects of the present disclosure. The example shown includes user 100, user device 105, blur classification apparatus 110, cloud 115, and database 120. Blur classification apparatus 110 is an example of, or includes aspects of, the corresponding element described with reference to FIG. 5.

In the example of FIG. 1, the user 100 communicates with the blur classification apparatus 110 via the user device 105 and the cloud 115. For example, the user 100 may upload a digital image using an image editing application implemented on the user device 105. Blur classification apparatus 110 receives the image, which includes regions with different blur levels. An image encoder of the blur classification apparatus 110 generates an embedded representation of the image.

In the example illustrated in FIG. 1, the digital image includes a main subject (i.e., tortoise) in the foreground of the image and a background full of fish and waves. The user device 105 transmits the image to the blur classification apparatus 110 for blur map estimation and blur classification prediction. In some embodiments, the blur classification apparatus 110 is located on the user device 105. In some cases, a set of digital photos are stored within the database 120 for retrieval by the blur classification apparatus 110.

The blur classification apparatus 110 is configured to perform low-level (e.g., pixel-level) blur detection and high-level (e.g., global) image understanding for blur desirability classification. For example, a blur classification network model is trained to predict an image level blur classification and a map decoder may be configured to generate a blur map. The user 100 may choose to preserve or discard the image based on the image level blur classification (e.g., desired, undesired, clear, moderate image, see FIG. 3), or to edit the image based on the blur map (i.e., crop out the blurred portions).

The user device 105 may be a personal computer, laptop computer, mainframe computer, palmtop computer, personal assistant, mobile device, or any other suitable processing apparatus. In some examples, the user device 105 includes an image editing application. The image editing application may either include or communicate with the blur classification apparatus 110.

The blur classification apparatus 110 includes a computer implemented network that predicts a blur classification of the image based on the embedded representation using a classification layer, wherein the image encoder and the classification layer are trained based on a classification loss. Additionally or alternatively, the blur classification apparatus 110 predicts a blur map of the image based on the embedded representation using a map decoder, wherein the image encoder and the map decoder are trained based on a map loss. According to some embodiments, the blur classification apparatus 110 includes an image encoder, a classification layer, and a map decoder.

The blur classification apparatus 110 may also include a processor unit, a memory unit, a training component, and a user interface. The training component is used to train the blur classification network. Additionally, the blur classification apparatus 110 can communicate with the database 120 via the cloud 115. In some cases, the architecture of the blur classification network is also referred to as a network model. Further detail regarding the architecture of the blur classification apparatus 110 is provided with reference to FIGS. 5, 6, and 7. Further detail regarding the operation of the blur classification apparatus 110 is provided with reference to FIG. 4.

In some cases, the blur classification apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, the cloud 115 provides resources without active management by the user. The term cloud 115 is sometimes used to describe data centers available to many users over the Internet. Some large cloud networks have functions distributed over multiple locations from central servers. A server is designated an edge server if it has a direct or close connection to a user. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction.

Figure 2:
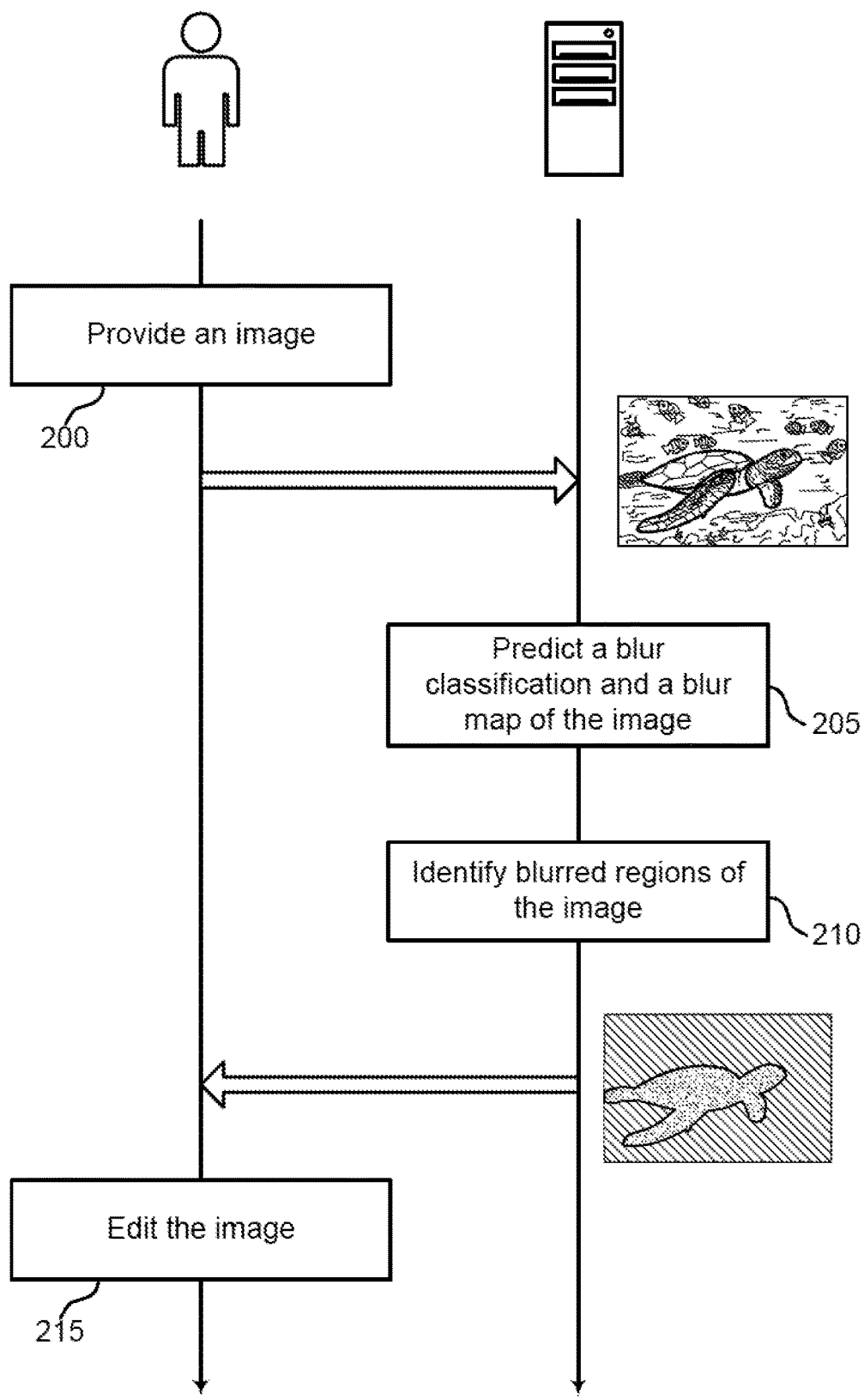
FIG. 2 shows an example of image processing according to aspects of the present disclosure.

FIG. 2 shows an example of image processing according to aspects of the present disclosure. In some examples, these operations are performed by a system as in claim 13. The system includes a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the user provides an image. According to an example, the image is a digital photo. The digital photo includes a main subject (tortoise) and a background full of fish and waves. The main subject is clear, and the background is made blurry on purpose with depth-of-field effect. In some examples, the image includes a high-resolution professional photo taken by a professional photographer. In some cases, the operations of this step refer to, or may be performed by, a user operating a user interface as described with reference to FIGS. 1 and 5.

At operation 205, the system predicts a blur classification and a blur map of the image. One or more embodiments of the present disclosure provide a multi-task, multi-dataset approach which detects spatially varying blur and understands image level blur (i.e., impact of blur on the image quality) simultaneously. The system is able to produce blur desirability classification and blur map estimation simultaneously. In some cases, the operations of this step refer to, or may be performed by, a blur classification network as described with reference to FIG. 5.

In some embodiments, the system is configured to automatically understand the blur desirability, i.e., whether the blur is desired or not, and how it affects the quality of the image. The system depends on low-level visual features to identify blurry regions, as well as has high-level understanding of the image content and user intent during photo capture.

In some embodiments, the system provides a unified network model to estimate a spatially-varying blur map and understand its desirability in terms of image quality at the same time. If blur exists, the system classifies its desirability to multiple levels ranging from good to bad. In some cases, the network model is end-to-end jointly trained with both supervisions of pixel-wise blur responses and image-wise blur desirability levels.

At operation 210, the system identifies blurred regions of the image. Image blur is common in natural photos, arising from different factors such as object motion, camera lens out-of-focus, and camera shake. In some cases, image blur is undesired, when important regions are blurry and become less sharp. In some other cases, image desire is desired, when the background of an image is blurred to make the subject pop out, or motion blur is added to give the image artistic look. According to the example above, the background (e.g., fish and waves) were blurry on purpose to enhance the main subject (tortoise). In some cases, the operations of this step refer to, or may be performed by, a blur classification network as described with reference to FIG. 5.

At operation 215, the user edits the image. The system detects the undesired blur and subsequently the user can remove blurry portions using an image editing application software (e.g., Adobe® Photoshop). Alternatively or additionally, the system estimates the desired blur and then enhances the desired blurry portions. The system is configured to automatically understand whether such blur is desired or not in the first place, which would be useful to help users categorize photos and make corresponding edits. It may also be used to estimate photo quality and applied in photo curation, photo collage creation, image quality and aesthetics, and video summarization. In some cases, the operations of this step refer to, or may be performed by, a user operating a user interface as described with reference to FIGS. 1 and 5.

Figure 3:
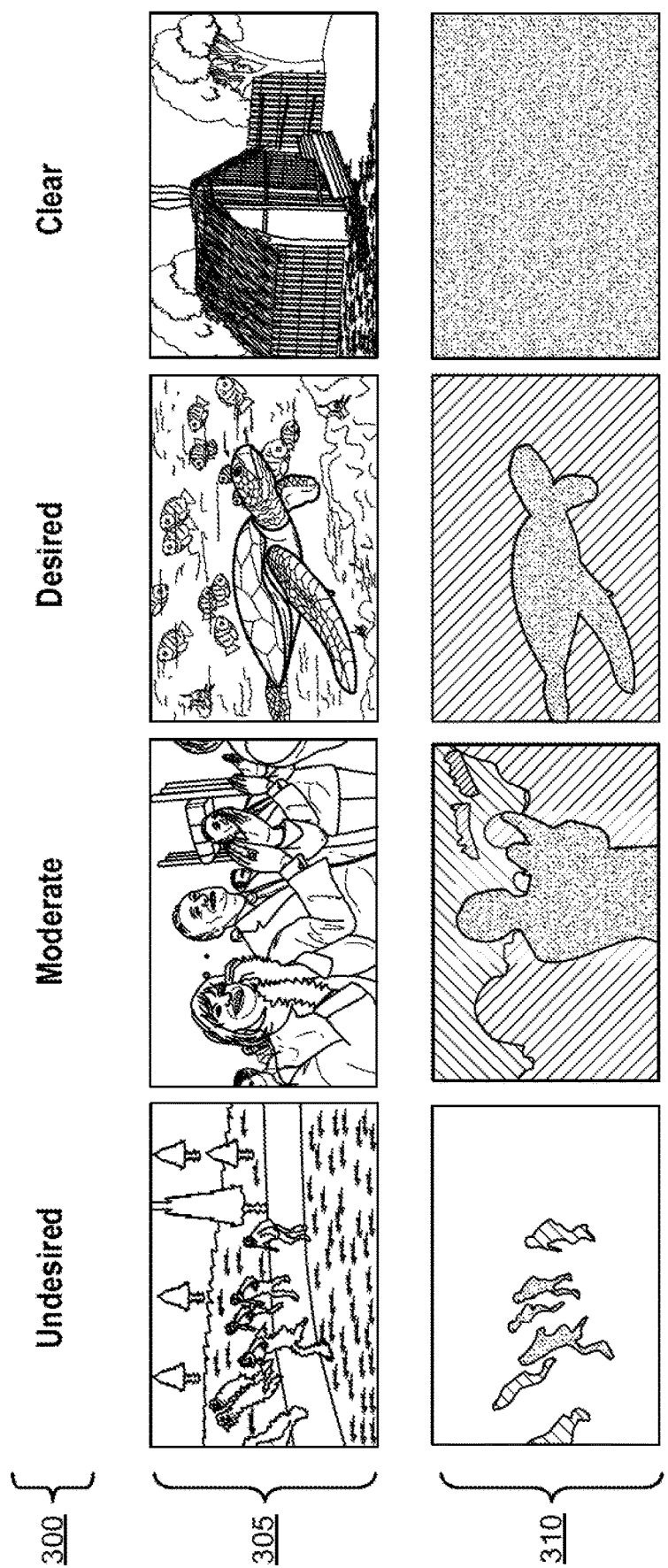
FIG. 3 shows an example of blur categorization and blur mapping according to aspects of the present disclosure.

FIG. 3 shows an example of blur categorization and blur mapping according to aspects of the present disclosure. The example shown includes blur categorization 300 on the high-level (e.g., global), images 305, and blur maps 310. One or more embodiments of the present disclosure provide apparatus, systems and methods to understand quality of an image in terms of image-level blur and also detect spatially-varying blur (e.g., pixel-level blur).

In an embodiment, the blur classification apparatus automatically determines if blur exists in a given image (e.g., a digital image file), and if exists, the blur classification apparatus can accurately estimate spatially-varying blur amount and categorize the blur desirability in terms of image quality. For example, the blur classification network is able to determine or classify whether the blur is desired or not, and how it affects the quality of a photo.

In some examples, an accurate blur map 310 can be used in many applications such as image deblur, blur magnification and focus stacking. Blur desirability classification can help users categorize photos and make corresponding edits. It can also be used to estimate photo quality and applied in photo curation, photo collage creation, best frame selection from a video, and video summarization.

Blur desirability classification is important and a challenging task. For example, a photo with shallow depth-of-field effect can be a photo with good image quality if the subject is highlighted because of background blur. The same photo can also be a photo with poor image quality if the main subject is out of focus. According to some embodiments, the blur classification apparatus depends on accurate spatially-varying blur amount estimation, and also is configured to determine if the blurry regions are important from the perspective of image content and a user's intent when capturing the photo. For example, a professional photographer takes a long exposure photo highlighting the main subjects (e.g., a bride and a bridegroom) and leaving the background of the image blurry on purpose (e.g., guests and the bridesmaids).

In some cases, a blur classification dataset, such as the SmartBlur dataset, is used to train the network. The blur classification network is not limited to binary classification tasks, but rather the network is configured to be fine-grained. The network can determine a category each image belongs to. There are multiple blur desirability categories such as undesired, moderate, desired, and clear.

For image level blur, the blur classification network determines a type of blur desirability associated with an image. The network indicates whether a blur was intended to be good blur (e.g., add value to the picture) or the blurry portion was not intended (e.g., bad blur). If an image is all blurry, then the image is undesired. If the blur category is determined as "moderate", then it means there is some blur (e.g., clapping hands), and the blurry portion does not hurt the image too much. The image may be preserved. Clear category means there is no blur at all (i.e., an all-focus picture). Images falling under the clear category are preserved.

According to an example shown in FIG. 3, on the first row, there are four images 305 and their respective blur maps 310 on the second row. The first image includes a few runners. The first image is classified as an undesired image because the blurry portions were not intended (represented by curvy lines). The blurry runners are the subject intended to be captured by a user and are more important than other content in the scene.

The second image on the first row includes several people clapping their hands. A woman's hands are blurry (the woman on the left of the second image). The second image is classified as a moderate image because the blurry portions (i.e., hands of the woman) does not hurt or disrupt the image quality of the second image too much as an entirety.

The third image includes a main subject in the foreground of the image and a background. Due to depth-of-field effect, the main subject (tortoise) is clear, and the rest of the image is made blurry or out-of-focus on purpose. The third image is classified as a desired image because the main subject is clear and the blurry portions were intended by a user (e.g., a professional photographer using depth-of-field effect). The fourth image is classified as a clear image because both the house and the background are clear. No blurry portion is detected using the blur classification network.

As for the blur maps 310 presented on the second row, dark color indicates lower blur amount (i.e., clear pixels) while brighter color (e.g., white or white-grey) indicates higher blur amount. According to the example shown in FIG. 3, blurry portions are represented by upward or downward diagonal pattern fill in the blur maps 310. Non-blurry portions (i.e., clear pixels) are represented by checkerboard pattern fill (e.g., dense dots) in the blur map 310.

In some embodiments, each image is classified based on visual appearance with pre-defined criteria, such as no blur (no visible blur), low blur (the blur is visible, but people can still see the details in a blurred region), medium blur (the details are not clear anymore), and high blur (not only details are missing, the textures are largely changed, and the shapes are distorted). The boundary of each region is annotated based on the blur amount, instead of object semantics. For image-level blur desirability, each image is labeled with multiple categories, e.g., good-blur, ok-blur, bad-blur, or no-blur. Good-blur indicates the blur is manipulated by photographers to create visually pleasing effects. The blur in good-blur images often appears on the background or unimportant objects. Ok-blur indicates the blur is on some small or unimportant regions, or with negligible small amount. Such blur is not created on purpose, and is usually generated due to imperfect capture conditions or limited experience of the photographer. Bad-blur indicates the blur is on the important objects with non-negligible amount. Such blur is not desirable and significantly degrades the image quality. No-blur indicates the whole image is sharp without any blur in it.

Figure 4:
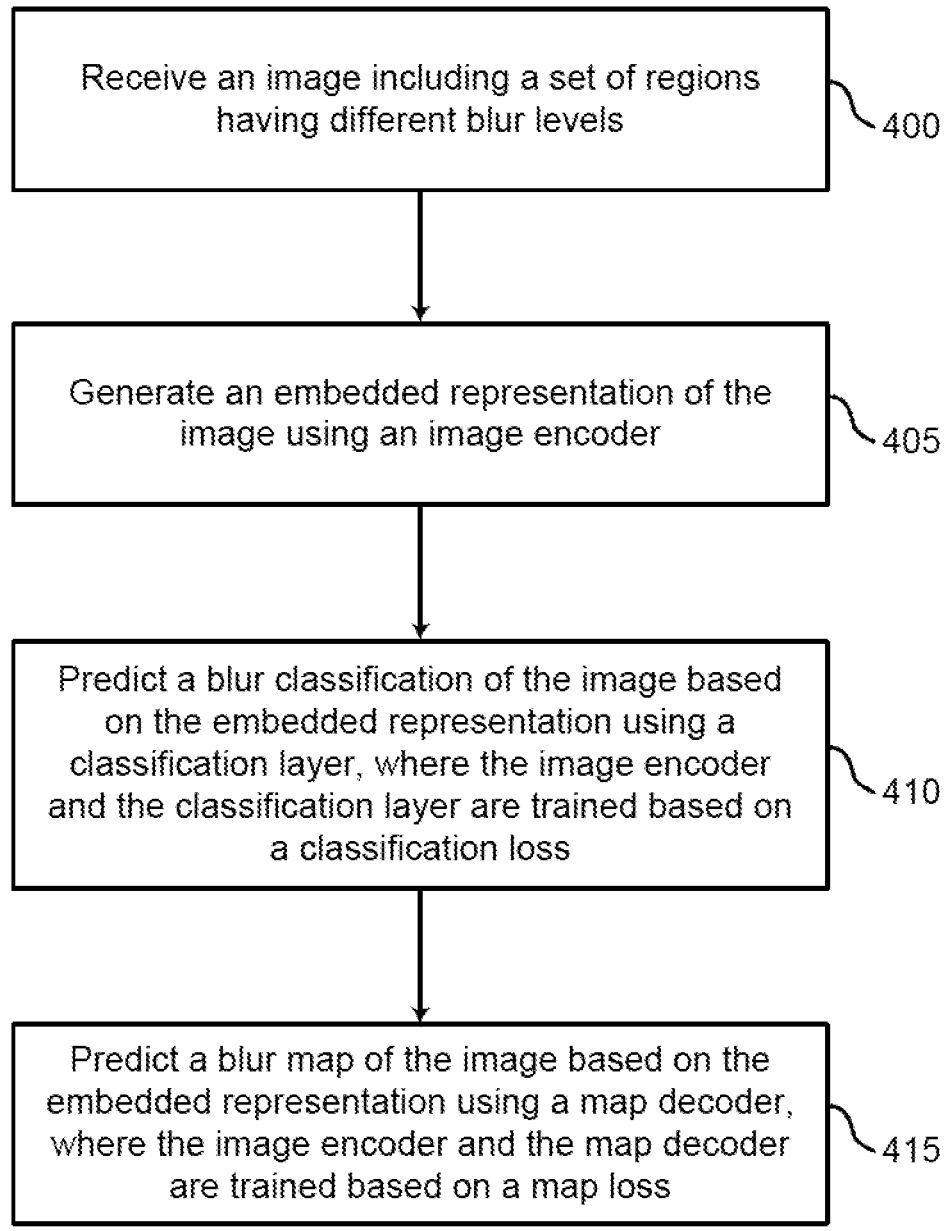
FIG. 4 shows an example of a process for blur classification according to aspects of the present disclosure.

FIG. 4 shows an example of a process for blur classification according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for image processing is described. One or more embodiments of the method include receiving an image comprising a plurality of regions having different blur levels, generating an embedded representation of the image using an image encoder, predicting a blur classification of the image based on the embedded representation using a classification layer, wherein the image encoder and the classification layer are trained based on a classification loss, and predicting a blur map of the image based on the embedded representation using a map decoder, wherein the image encoder and the map decoder are trained based on a map loss.

In some cases, the blur classification apparatus applies image segmentation techniques from digital image processing and computer vision. Image segmentation is the process of partitioning a digital image into multiple segments (sets of pixels, also known as image objects). The goal of segmentation is to simplify and/or change the representation of an image into something that is more meaningful and easier to analyze. Image segmentation is typically used to locate objects and boundaries (lines, curves, etc.) in images. More precisely, image segmentation is the process of assigning a label to every pixel in an image such that pixels with the same label share certain characteristics.

At operation 400, the system receives an image including a set of regions having different blur levels. According to an example, the image is a digital photo. The digital photo may be taken by a professional photographer. In some cases, the digital photo includes undesired blurry portions (e.g., camera shaking when a user takes a picture). In some other cases, the digital photo includes desired blurry portions (e.g., depth-of-field effect to make the main subject pop out). The operations of this step refer to, or may be performed by, a user using a user interface as described with reference to FIG. 5.

At operation 405, the system generates an embedded representation of the image using an image encoder. In some cases, the operations of this step refer to, or may be performed by, an image encoder as described with reference to FIGS. 5-7.

At operation 410, the system predicts a blur classification of the image based on the embedded representation using a classification layer, where the image encoder and the classification layer are trained based on a classification loss. In some cases, the operations of this step refer to, or may be performed by, a classification layer as described with reference to FIGS. 5 and 6.

In some embodiments, the system is configured to automatically understand image blur in terms of image quality. The system may generate spatially-variant blur responses, and understand if such responses are desired by distilling high-level image semantics.

For image level blur, the system determines the type of blur that is associated with the image. The system is configured to predict a blur classification of the image (i.e., whether a blur was intended to be good blur, or the blurry portion was not intended). For example, when a blurry portion adds value to an image, it is considered a good blur. When a blurry portion disrupts the overall quality of the image, it is considered a bad blur. If an image is all blurry and users are not able to tell subjects and content, then the image is undesired. An undesired image is often filtered out or discarded by the user. If the blur category is determined as "moderate", then it means there is some blur (e.g., clapping hands of the woman as shown in FIG. 3), and the blurry portion does not hurt the image much. The image may be preserved by a user. Clear category means there is no blur at all (i.e., an all-focus image). Embodiments of the present disclosure are not limited to the four blur classifications mentioned above including undesired, moderate, desired, and clear.

At operation 415, the system predicts a blur map of the image based on the embedded representation using a map decoder, where the image encoder and the map decoder are trained based on a map loss. In some cases, the operations of this step refer to, or may be performed by, a map decoder as described with reference to FIGS. 5-7.

In an embodiment, the system predicts multiple blur class, and the blur class may be evaluated based on the amount of blur at each pixel. The blur classification network outputs a blur map, which includes pixel level information of the image. In some examples, SmartBlur dataset is used for training the network and SmartBlur dataset includes both types of information (image level information and pixel level information).

An apparatus for image processing is described. The apparatus includes a processor, memory in electronic communication with the processor, and instructions stored in the memory. The instructions are operable to cause the processor to perform the steps of receiving an image comprising a plurality of regions having different blur levels, generating an embedded representation of the image using an image encoder, predicting a blur classification of the image based on the embedded representation using a classification layer, wherein the image encoder and the classification layer are trained based on a classification loss, and predicting a blur map of the image based on the embedded representation using a map decoder, wherein the image encoder and the map decoder are trained based on a map loss.

A non-transitory computer readable medium storing code for image processing is described. In some examples, the code comprises instructions executable by a processor to perform the steps of receiving an image comprising a plurality of regions having different blur levels, generating an embedded representation of the image using an image encoder, predicting a blur classification of the image based on the embedded representation using a classification layer, wherein the image encoder and the classification layer are trained based on a classification loss, and predicting a blur map of the image based on the embedded representation using a map decoder, wherein the image encoder and the map decoder are trained based on a map loss.

Some examples of the method, apparatus, and non-transitory computer readable medium described above further include determining an image quality based on the blur classification. Some examples of the method, apparatus, and non-transitory computer readable medium described above further include editing the image based on the blur map.

In some examples, the classification layer is not trained based on the map loss. In some examples, the map decoder is not trained based on the classification loss. In some examples, the blur classification comprises a plurality of probability values corresponding to different blur categories, wherein each of the different blur categories represents a global property of the image. In some examples, the different blur categories include a positive category, a moderate category, a negative category, and a clear category. In some examples, the blur map comprises a pixel-level indication of a blur level.

Network Architecture

Figure 5:
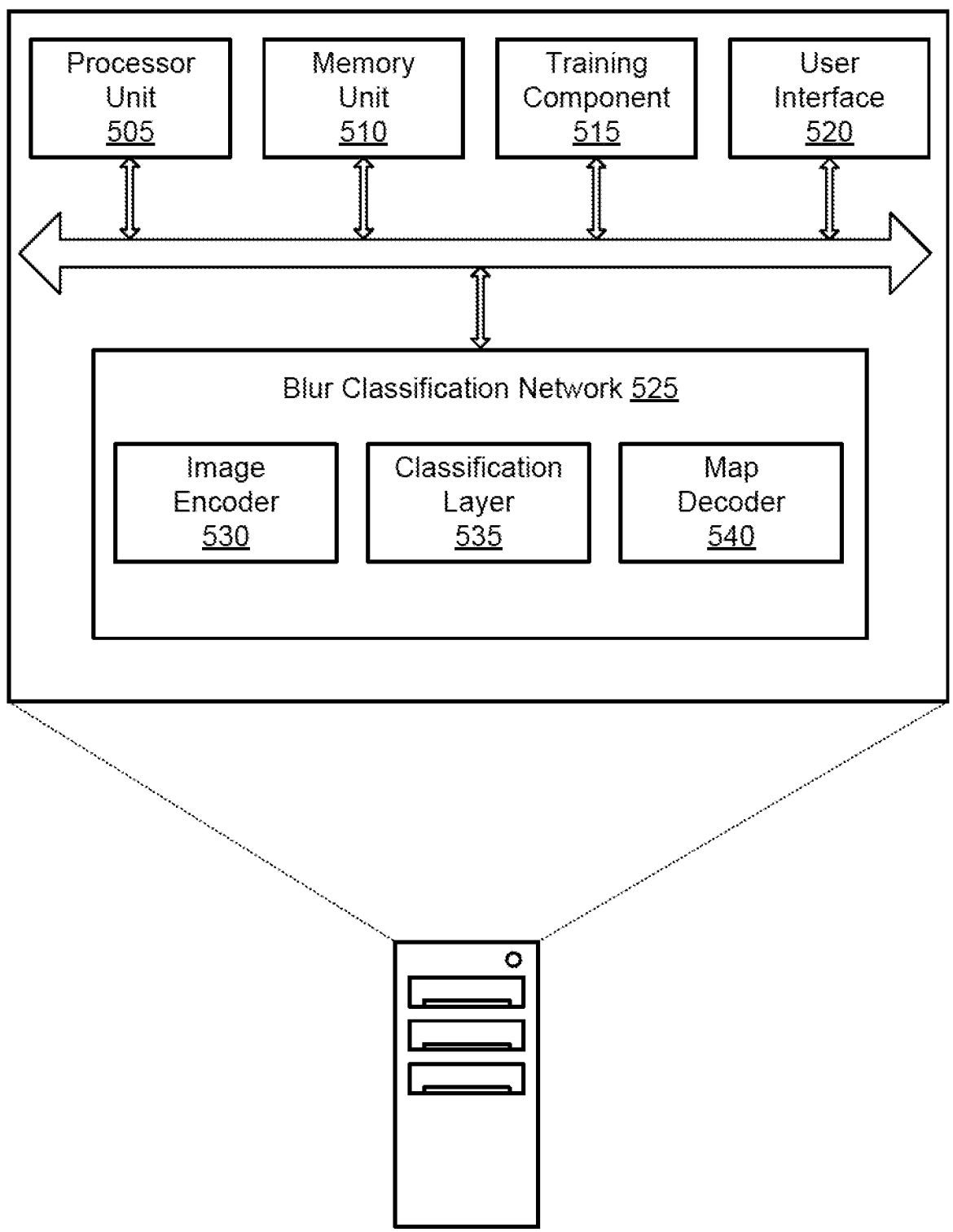
FIG. 5 shows an example of a blur classification apparatus according to aspects of the present disclosure.

FIG. 5 shows an example of an apparatus for blur classification according to aspects of the present disclosure. A blur classification apparatus may include processor unit 505, memory unit 510, training component 515, user interface 520, and blur classification network 525. Blur classification apparatus is an example of, or includes aspects of, the corresponding element described with reference to FIG. 1.

In one embodiment, the blur classification apparatus includes an image encoder 530 configured to generate an embedded representation of an image, a classification layer 535 configured to predict a blur classification of the image based on the embedded representation, wherein the image encoder 530 and the classification layer 535 are trained based on a classification loss, and a map decoder 540 configured to predict a blur map of the image based on the embedded representation, wherein the image encoder 530 and the map decoder 540 are trained based on a map loss.

According to some embodiments of the present disclosure, the blur classification apparatus includes a computer implemented artificial neural network (ANN) that produces a blur classification of an image and/or a blur map of an image. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

A convolutional neural network (CNN) is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

A processor unit 505 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 505 is configured to operate a memory array using a memory controller. In other cases, a memory controller is integrated into the processor unit 505. In some cases, the processor unit 505 is configured to execute computer-readable instructions stored in a memory to perform various functions. In some embodiments, a processor unit 505 includes special purpose components for modem processing, baseband processing, digital signal processing, or transmission processing.

Examples of a memory unit 510 include random access memory (RAM), read-only memory (ROM), or a hard disk. Examples of memory unit 510 include solid state memory and a hard disk drive. In some examples, a memory unit 510 is used to store computer-readable, computer-executable software including instructions that, when executed, cause a processor to perform various functions described herein. In some cases, the memory unit 510 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 510 store information in the form of a logical state.

According to some embodiments, training component 515 identifies a training set including a first image that includes a ground truth blur classification and second image that includes a ground truth blur map. In some examples, training component 515 computes a classification loss based on the predicted blur classification and the ground truth blur classification. Training component 515 then trains the image encoder 530 and the classification layer 535 based on the classification loss. In some examples, training component 515 computes a map loss based on the blur map and the ground truth blur map. Training component 515 then trains the image encoder 530 and the map decoder 540 based on the map loss.

In some examples, training component 515 identifies a first training batch including the first image. Training component 515 then determines that the first training batch does not include ground truth blur map information. Training component 515 then freezes the map decoder 540 while training with the first batch based on the determination.

In some examples, training component 515 identifies a second training batch including the second image. Training component 515 then determines that the second training batch does not include ground truth blur classification information. Training component 515 then freezes the classification layer 535 while training with the second batch based on the determination.

In some examples, training component 515 identifies a second training batch including the second image. Training component 515 then determines that the second training batch includes ground truth blur classification information and ground truth blur map information. Training component 515 then trains the image encoder 530, the classification layer 535, and the map decoder 540 jointly based on the determination. In some examples, training component 515 identifies a joint loss function including the classification loss and the map loss, where the image encoder 530, the classification layer 535, and the map decoder 540 are jointly trained using the joint loss function.

In some examples, the classification loss includes a softmax cross entropy loss between the ground truth blur classification and the predicted blur classification. In some examples, the map loss includes an L2 loss between the ground truth blur map and the predicted blur map.

According to some embodiments, user interface 520 receives an image including a set of regions having different blur levels. The image is uploaded by a user or was previously stored in a database and the user interface 520 retrieves the image following the user's commands. In some examples, a user may edit the image based on the blur map using the user interface 520.

According to some embodiments, blur classification network 525 determines image quality of an image based on the blur classification. Blur classification network 525 includes image encoder 530, classification layer 535, and map decoder 540. Image encoder 530 generates a first embedded representation of the first image and a second embedded representation of the second image.

According to some embodiments, image encoder 530 is configured to generate an embedded representation of an image. In some examples, the image encoder 530 includes a set of levels, where each of the levels of the image encoder 530 includes a different resolution. Image encoder 530 is an example of, or includes aspects of, the corresponding element described with reference to FIGS. 6 and 7.

According to some embodiments, classification layer 535 predicts a blur classification of the first image based on the first embedded representation. Classification layer 535 is configured to predict a blur classification of the image based on the embedded representation, wherein the image encoder 530 and the classification layer 535 are trained based on a classification loss. In some examples, the classification layer 535 includes a fully connected layer configured to output a set of values corresponding to a set of blur categories.

According to some embodiments, classification layer 535 predicts a blur classification of the image based on the embedded representation, where the image encoder 530 and the classification layer 535 are trained based on a classification loss. In some examples, the classification layer 535 is not trained based on the map loss. In some examples, the blur classification includes a set of probability values corresponding to different blur categories, where each of the different blur categories represents a global property of the image. In some examples, the different blur categories include a positive category, a moderate category, a negative category, and a clear category. Classification layer 535 is an example of, or includes aspects of, the corresponding element described with reference to FIG. 6.

According to some embodiments, map decoder 540 predicts a blur map of the second image based on the second embedded representation. According to some embodiments, map decoder 540 is configured to predict a blur map of the image based on the embedded representation, wherein the image encoder 530 and the map decoder 540 are trained based on a map loss. In some examples, the map decoder 540 includes a set of levels, where each of the levels of the map decoder 540 takes input from a different level of the levels of the image encoder 530.

In some examples, the map decoder 540 includes a feature pyramid network (FPN). A FPN is a feature extractor that generates multiple feature map layers (multi-scale feature maps) for object detection. Each feature map layer corresponds to a different resolution. For example, each layer of the feature pyramid represents the image feature using an array with a different number of values.

According to some embodiments, map decoder 540 predicts a blur map of the image based on the embedded representation, where the image encoder 530 and the map decoder 540 are trained based on a map loss. In some examples, the map decoder 540 is not trained based on the classification loss. In some examples, the blur map includes a pixel-level indication of a blur level. Map decoder 540 is an example of, or includes aspects of, the corresponding element described with reference to FIGS. 6 and 7.

A method of providing an apparatus for image processing is described. The method includes an image encoder configured to generate an embedded representation of an image, a classification layer configured to predict a blur classification of the image based on the embedded representation, wherein the image encoder and the classification layer are trained based on a classification loss, and a map decoder configured to predict a blur map of the image based on the embedded representation, wherein the image encoder and the map decoder are trained based on a map loss.

In some examples, the image encoder comprises a plurality of levels, wherein each of the levels of the image encoder comprises a different resolution. In some examples, the map decoder comprises a plurality of levels, wherein each of the levels of the map decoder takes input from a different level of the levels of the image encoder. In some examples, the map decoder comprises a feature pyramid network (FPN). In some examples, the classification layer comprises a fully connected layer configured to output a plurality of values corresponding to a plurality of blur categories.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 6:
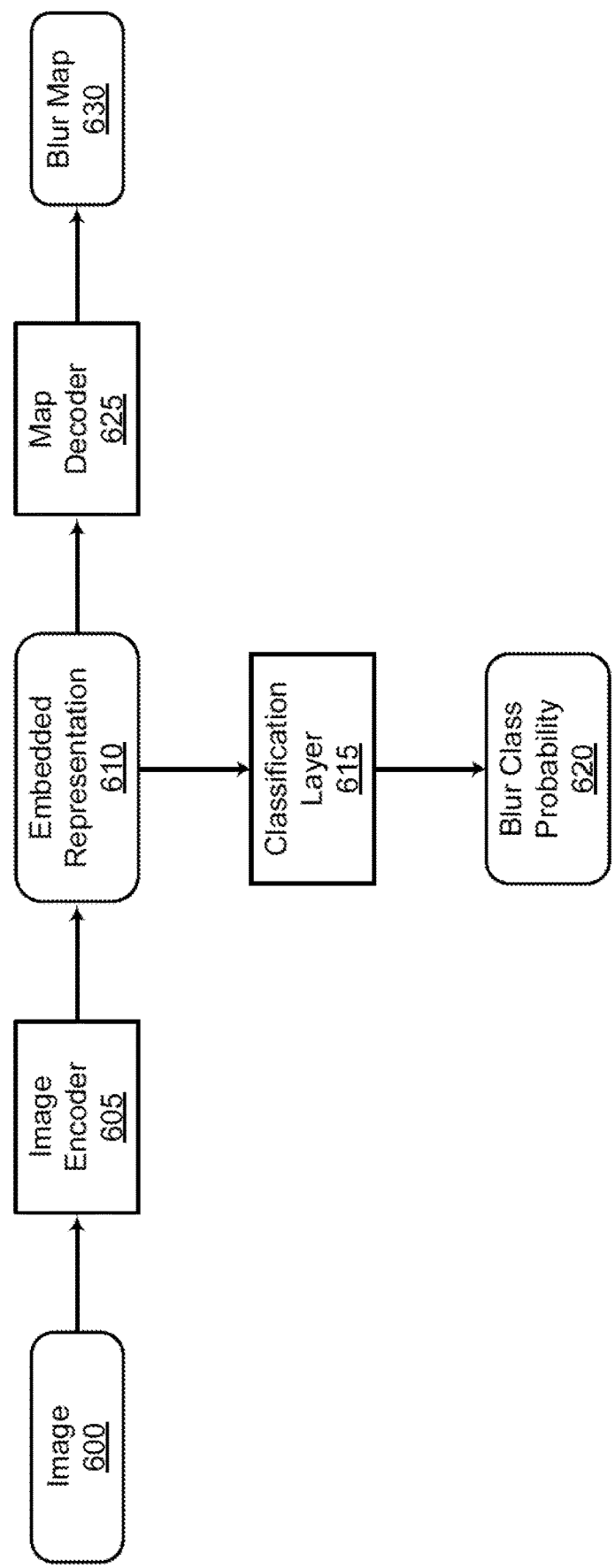
FIGS. 6 and 7 show examples of a blur classification network according to aspects of the present disclosure.

FIG. 6 shows an example of a blur classification network according to aspects of the present disclosure. The example shown includes image 600, image encoder 605, embedded representation 610, classification layer 615, blur class probability 620, map decoder 625, and blur map 630.

In some embodiments, the blur classification network uses a multi-task, multi-dataset approach which jointly learns low-level blur estimation and high-level understanding on important image content. Given an image, the blur classification network automatically determines if blur exists in the image. If blur exists, the network accurately estimates spatially-varying blur amount and classify its blur desirability into multiple categories ranging from good to bad blur (e.g., four categories including positive, moderate, negative or clear category), by distilling high-level semantics and exploiting a pyramid network architecture.

From left to right, an image 600 is input to an image encoder 605 to generate embedded representation 610. The embedded representation 610 is then input to the map decoder 625, which outputs a blur map 630. In some cases, the embedded representation 610 is input to the classification layer 615, which outputs a blur class probability 620. In some examples, the classification layer 615 includes fully connected layer having at least one layer.

Image encoder 605 is an example of, or includes aspects of, the corresponding element described with reference to FIGS. 5 and 7. Classification layer 615 is an example of, or includes aspects of, the corresponding element described with reference to FIG. 5. Map decoder 625 is an example of, or includes aspects of, the corresponding element described with reference to FIGS. 5 and 7.

Figure 7:
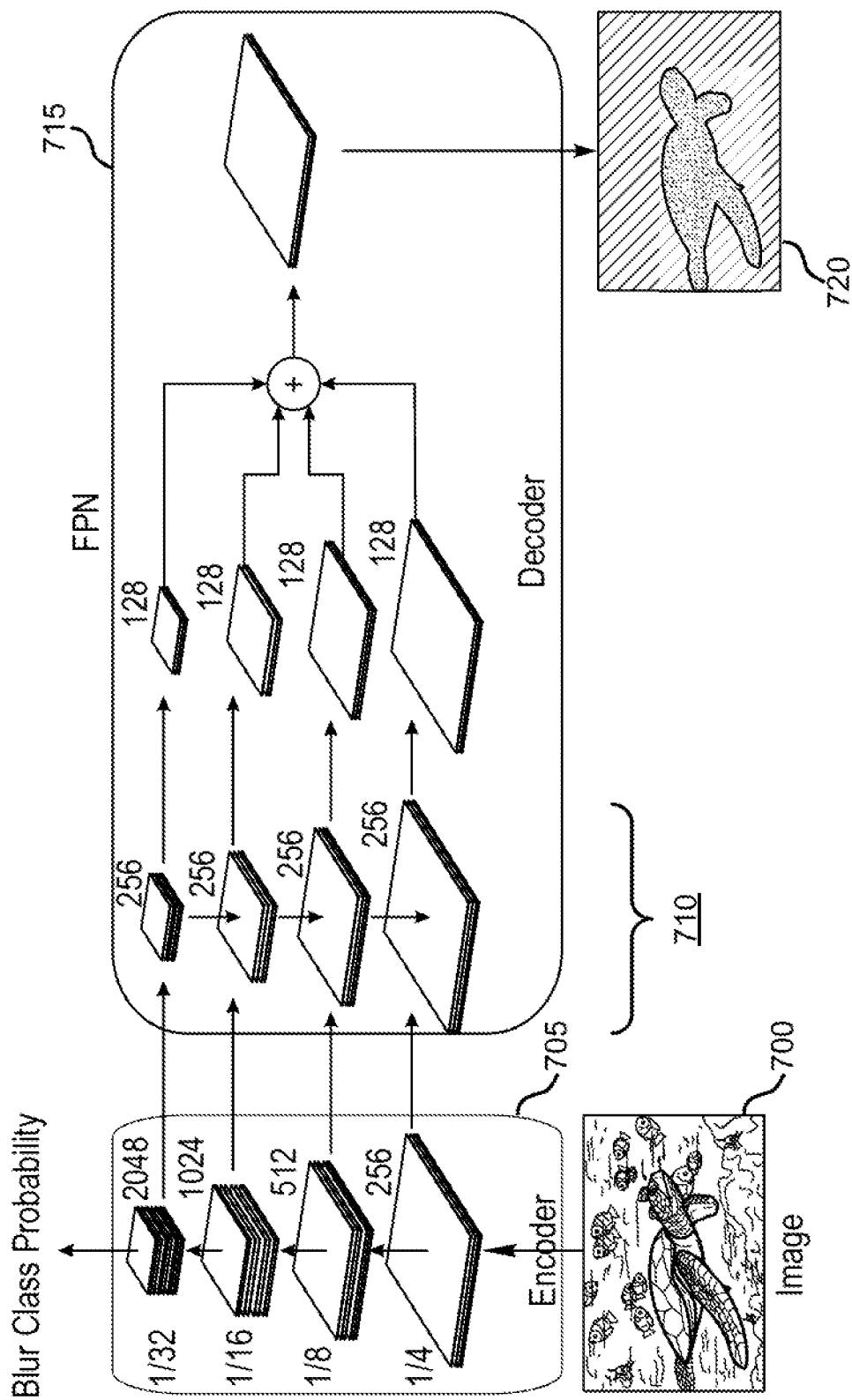

FIG. 7 shows an example of a blur classification network according to aspects of the present disclosure. The example shown includes image 700, image encoder 705, embedded representation 710, map decoder 715, and blur map 720.

In some embodiments, the blur classification network is configured to understand image blur in terms of image quality. The blur classification network depends on low-level visual features to detect blur regions, but also has high-level understanding of the image content and user intent. In some examples, the blur classification network includes a unified framework to jointly estimate spatially-varying blur map and understand its effect on image quality to classify blur desirability.

From left to right, an image 700 is input to an image encoder 705 to generate embedded representation 710. The embedded representation 710 is then input to the map decoder 715, which outputs a blur map 720. According to an example, the image 700 includes a main subject (i.e., a tortoise) in the foreground of the image 700 and a background full of fish and waves. Due to depth-of-field effect, the main subject (tortoise) is clear, and the rest of the image is made blurry or out-of-focus on purpose. Image encoder 705 and map decoder 715 are examples of, or includes aspects of, the corresponding elements described with reference to FIGS. 5 and 6.

As for the blur map 720, dark color indicates lower blur amount (i.e., clear pixels) while brighter color (e.g., white or white grey) indicates higher blur amount. As illustrated in FIG. 7, blurry portions are represented by upward or downward diagonal pattern fill. Non-blurry portions are represented by checkerboard pattern fill (e.g., dense dots). The image 700 is classified as a desired image because the main subject is clear and the blurry portion was intended by a user (e.g., a professional photographer using depth-of-field effect). Blur map 720 is an example of, or includes aspects of, the corresponding element described with reference to FIG. 6.

According to an embodiment, the image encoder 705 includes a classification network. For example, in one embodiment the image encoder 705 is based on a residual network architecture such as ResNeXt. ResNeXt is a homogeneous neural network which reduces the number of hyper-parameters required by a conventional ResNet. An image is input to the image encoder 705 to generate an embedded representation of the image. Then, the blur classification network can output blur class probability (from bottom to top) based on the embedded representation of the image.

According to an embodiment, an embedded representation 710 of the image is input to a map decoder 715 to generate a blur map of the image (from left to right). In some examples, the map decoder 715 is a feature pyramid network (FPN). However, embodiments of the present disclosure is not limited to FPN architecture.

In some embodiments, the blur classification system includes an encoder-decoder based network architecture. The image encoder 705 is ResNeXt with Squeeze-Excite modules. The map decoder 715 is a feature pyramid network (FPN). ResNeXt's split-transform-merge strategy may be used along with a content aware mechanism (e.g., Squeeze-Excite) to weight each channel adaptively helps capture blur and extract better features. A fully connected (FC) layer is built on top of those features for blur classification (i.e., impact of blur on image-level quality).

Processing multiple scale images is time consuming and memory demand is too high to be trained end-to-end simultaneously. As an alternative, the blur classification system applies feature pyramid network (FPN) techniques. FPN is a feature extractor that generates multiple feature map layers (multi-scale feature maps) with improved quality information than regular feature pyramid for object detection. In some examples, FPN architecture includes a bottom-up and a top-down pathway. The bottom-up pathway is the usual convolutional network for feature extraction. The spatial resolution decreases when going up the pathway. With more high-level structures detected, the semantic value for each layer increases. Additionally, FPN provides a top-down pathway to construct higher resolution layers from a semantic rich layer. Lateral connections are also added between reconstructed layers and the corresponding feature maps to help the detector to predict the location better.

In some embodiments, an FPN top-down pathway used with lateral connections help build high-level semantic feature maps at all scales. The high-resolution and high-semantic information cues from bottom and top layers respectively helps estimate blur maps 720 which are invariant to multiple object scales.

Training and Evaluation

Figure 8:
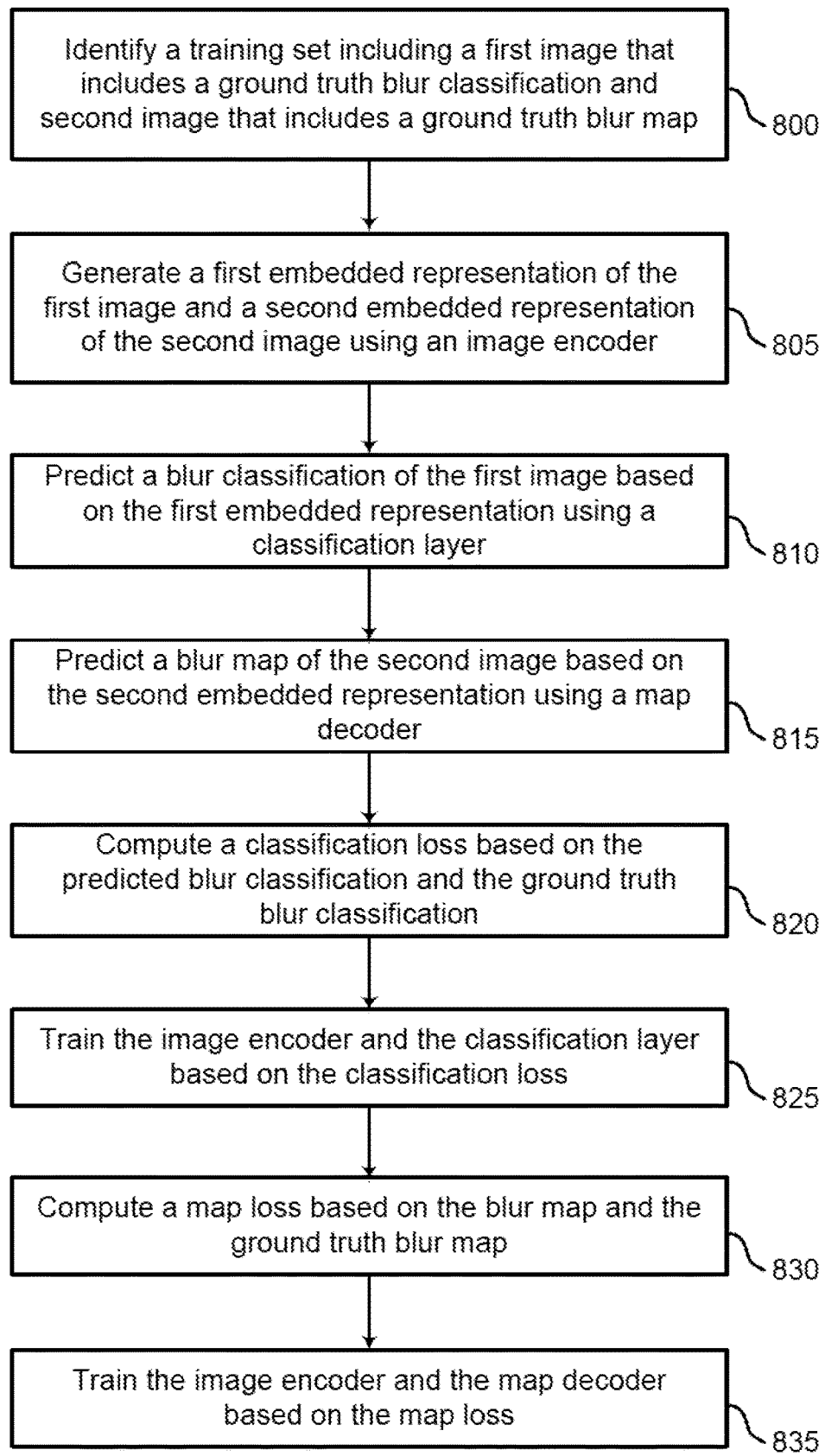
FIG. 8 shows an example of a process for training a blur classification network according to aspects of the present disclosure.

FIG. 8 shows an example of a process for training a blur classification network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for training a machine learning model is described. One or more embodiments of the method include identifying a training set comprising a first image that includes a ground truth blur classification and second image that includes a ground truth blur map, generating a first embedded representation of the first image and a second embedded representation of the second image using an image encoder, predicting a blur classification of the first image based on the first embedded representation using a classification layer, predicting a blur map of the second image based on the second embedded representation using a map decoder, computing a classification loss based on the predicted blur classification and the ground truth blur classification, training the image encoder and the classification layer based on the classification loss, computing a map loss based on the blur map and the ground truth blur map, and training the image encoder and the map decoder based on the map loss.

One or more embodiments of the present disclosure use supervised training techniques. A supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances, in other words, the learning algorithm generalizes from the training data to unseen examples.

Accordingly, the parameters and weights of a blur classification apparatus are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

At operation 800, the system identifies a training set including a first image that includes a ground truth blur classification and second image that includes a ground truth blur map. In some cases, the operations of this step refer to, or may be performed by, a training component as described with reference to FIG. 5.

In an embodiment, the system is configured to take images with no blur maps or image-level blur annotations as inputs during training. The system is scalable to multi-datasets with missing annotations.

For training, a training set may have exclusively image level blur labels or annotations. In these cases, the map decoder of the network model is frozen, and the image encoder is trained alone. The system is trained to filter out defect images from a set of images using image level information or annotations. In some other cases, pixel level blur information is included in a training set.

During training, some batches belong to a first type of dataset, while some batches belong to a second type of dataset. The first type of dataset may include ground truth blur map information (for pixel level). The second type of dataset may include ground truth blur classification information (for image level).

At operation 805, the system generates a first embedded representation of the first image and a second embedded representation of the second image using an image encoder. In some embodiments, the image encoder includes a set of levels, where each of the levels of the image encoder comprises a different resolution. In some cases, the operations of this step refer to, or may be performed by, an image encoder as described with reference to FIGS. 5 to 7.

At operation 810, the system predicts a blur classification of the first image based on the first embedded representation using a classification layer. In some embodiments, the classification layer includes a fully connected (FC) layer configured to output a set of values corresponding to a set of blur categories. For example, the set of blur categories include a positive category, a moderate category, a negative category, and a clear category. In some cases, the operations of this step refer to, or may be performed by, a classification layer as described with reference to FIGS. 5 and 6.

At operation 815, the system predicts a blur map of the second image based on the second embedded representation using a map decoder. In some embodiments, the map decoder includes a set of levels, wherein each of the levels of the map decoder takes input from a different level of the levels of the image encoder mentioned above. In some examples, the map decoder includes a feature pyramid network (FPN) architecture. In some cases, the operations of this step refer to, or may be performed by, a map decoder as described with reference to FIGS. 5 to 7.

At operation 820, the system computes a classification loss based on the predicted blur classification and the ground truth blur classification. In some cases, the operations of this step refer to, or may be performed by, a training component as described with reference to FIG. 5.

In some examples, a supervised training model may be used that includes a loss function that compares predictions of the network with ground truth training data. The term loss function refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

The system includes a total loss L formulated as below:

$$L = L_{B_m} + \lambda L_{B_c} \quad (1)$$

where the loss of the blur desirability classification $L_{B_c}$ is the softmax cross-entropy loss between the estimated blur class and the ground truth blur class.

At operation 825, the system trains the image encoder and the classification layer based on the classification loss. In some cases, the operations of this step refer to, or may be performed by, a training component as described with reference to FIG. 5.

At operation 830, the system computes a map loss based on the blur map and the ground truth blur map. In some cases, the operations of this step refer to, or may be performed by, a training component as described with reference to FIG. 5.

The system includes a loss function to train the network for predicting a blur map of an image. In some examples, an L2 loss is measured between the estimated blur map and the ground truth blur map. The system normalizes blur amounts into 0, ⅓, ⅔, and 1. The loss function of the blur map estimation is formulated as follows:

$$L_{B_m} = \frac{1}{2N} \sum_{i=1}^{N} \sum_{p=1}^{P} \left\| \frac{1}{1 + \exp(-b_i(p; \theta))} - b_i^0(p) \right\|_2^2 \quad (2)$$

where $b_i(p; \theta)$ is the estimated blur amount for pixel p in image i, and $\theta$ indicates parameters of blur estimation branch. $b_i^0(p)$ is the ground truth blur amount for pixel p in image i.

At operation 835, the system trains the image encoder and the map decoder based on the map loss. In some cases, the operations of this step refer to, or may be performed by, a training component as described with reference to FIG. 5.

In some cases, at training stage, the blur classification network uses SmartBlur dataset. The SmartBlur dataset contains 10,000 natural photos with elaborate human annotations of both pixel-level blur amount and image-level blur desirability. Use additional training data increases prediction accuracy of the network model (e.g., Lr & Flickr dataset may be another additional dataset for training the network model). As a result, the blur classification network can deal with broader types of scenes (e.g., a generalized set of digital photos). Furthermore, the network model can determine blur desirability and image quality for professional photos (e.g., photos used in Adobe® Lightroom, long exposure professional shots, photos with depth-of-field effect). The methods and systems of the present disclosure outperform all the baselines for the tasks of both blur map estimation and blur classification.

An apparatus for training a machine learning model is described. The apparatus includes a processor, memory in electronic communication with the processor, and instructions stored in the memory. The instructions are operable to cause the processor to perform the steps of identifying a training set comprising a first image that includes a ground truth blur classification and second image that includes a ground truth blur map, generating a first embedded representation of the first image and a second embedded representation of the second image using an image encoder, predicting a blur classification of the first image based on the first embedded representation using a classification layer, predicting a blur map of the second image based on the second embedded representation using a map decoder, computing a classification loss based on the predicted blur classification and the ground truth blur classification, training the image encoder and the classification layer based on the classification loss, computing a map loss based on the blur map and the ground truth blur map, and training the image encoder and the map decoder based on the map loss.

A non-transitory computer readable medium storing code for training a machine learning model is described. In some examples, the code comprises instructions executable by a processor to perform the steps of identifying a training set comprising a first image that includes a ground truth blur classification and second image that includes a ground truth blur map, generating a first embedded representation of the first image and a second embedded representation of the second image using an image encoder, predicting a blur classification of the first image based on the first embedded representation using a classification layer, predicting a blur map of the second image based on the second embedded representation using a map decoder, computing a classification loss based on the predicted blur classification and the ground truth blur classification, training the image encoder and the classification layer based on the classification loss, computing a map loss based on the blur map and the ground truth blur map, and training the image encoder and the map decoder based on the map loss.

Some examples of the method, apparatus, and non-transitory computer readable medium described above further include identifying a first training batch including the first image. Some examples further include determining that the first training batch does not include ground truth blur map information. Some examples further include freezing the map decoder while training with the first batch based on the determination.

Some examples of the method, apparatus, and non-transitory computer readable medium described above further include identifying a second training batch including the second image. Some examples further include determining that the second training batch does not include ground truth blur classification information. Some examples further include freezing the classification layer while training with the second batch based on the determination.

Some examples of the method, apparatus, and non-transitory computer readable medium described above further include identifying a second training batch including the second image. Some examples further include determining that the second training batch includes ground truth blur classification information and ground truth blur map information. Some examples further include training the image encoder, the classification layer, and the map decoder jointly based on the determination.

Some examples of the method, apparatus, and non-transitory computer readable medium described above further include identifying a joint loss function comprising the classification loss and the map loss, wherein the image encoder, the classification layer, and the map decoder are jointly trained using the joint loss function.

In some examples, the classification loss comprises a softmax cross entropy loss between the ground truth blur classification and the predicted blur classification. In some examples, the map loss comprises an L2 loss between the ground truth blur map and the predicted blur map.

Figure 9:
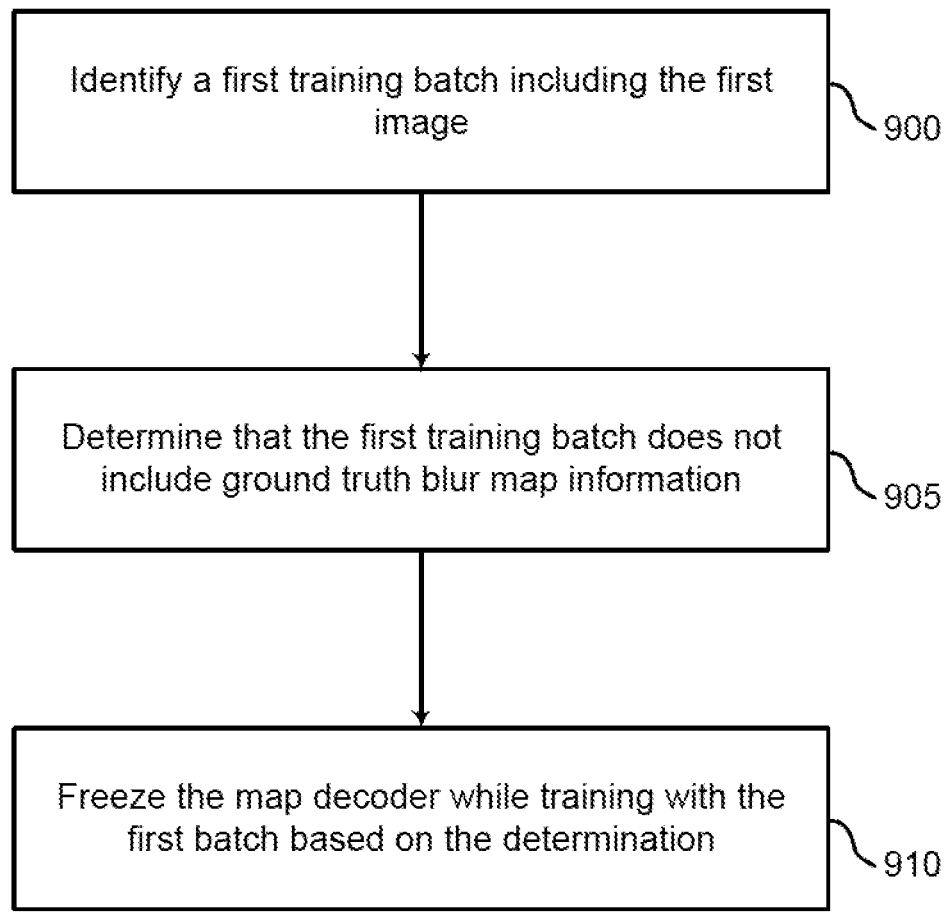
FIG. 9 shows an example of a process for freezing a map decoder during training according to aspects of the present disclosure.

FIG. 9 shows an example of a process for freezing a map decoder during training according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 900, the system identifies a first training batch including the first image. The first image includes a ground truth blur classification. In some examples, the blur classification includes a set of probability values corresponding to different blur categories, wherein each of the different blur categories represents a global property of the image. The different blur categories include a positive category, a moderate category, a negative category, and a clear category. However, embodiments of the present disclosure are not limited to the blur categories thereto. In some cases, the operations of this step refer to, or may be performed by, a training component as described with reference to FIG. 5.

At operation 905, the system determines that the first training batch does not include ground truth blur map information. In some examples, the first training batch includes exclusively ground truth blur classification information or annotations. In some cases, the operations of this step refer to, or may be performed by, a training component as described with reference to FIG. 5.

At operation 910, the system freezes the map decoder while training with the first batch based on the determination. When the system determines that a training batch does not include ground truth blur map information, the system freezes the map decoder while training the training batch. Weights of the map decoder of the network model are fixed. During testing or inference time, the system still can use the map decoder to predict the blur map for a given image. In some cases, the operations of this step refer to, or may be performed by, a training component as described with reference to FIG. 5.

Figure 10:
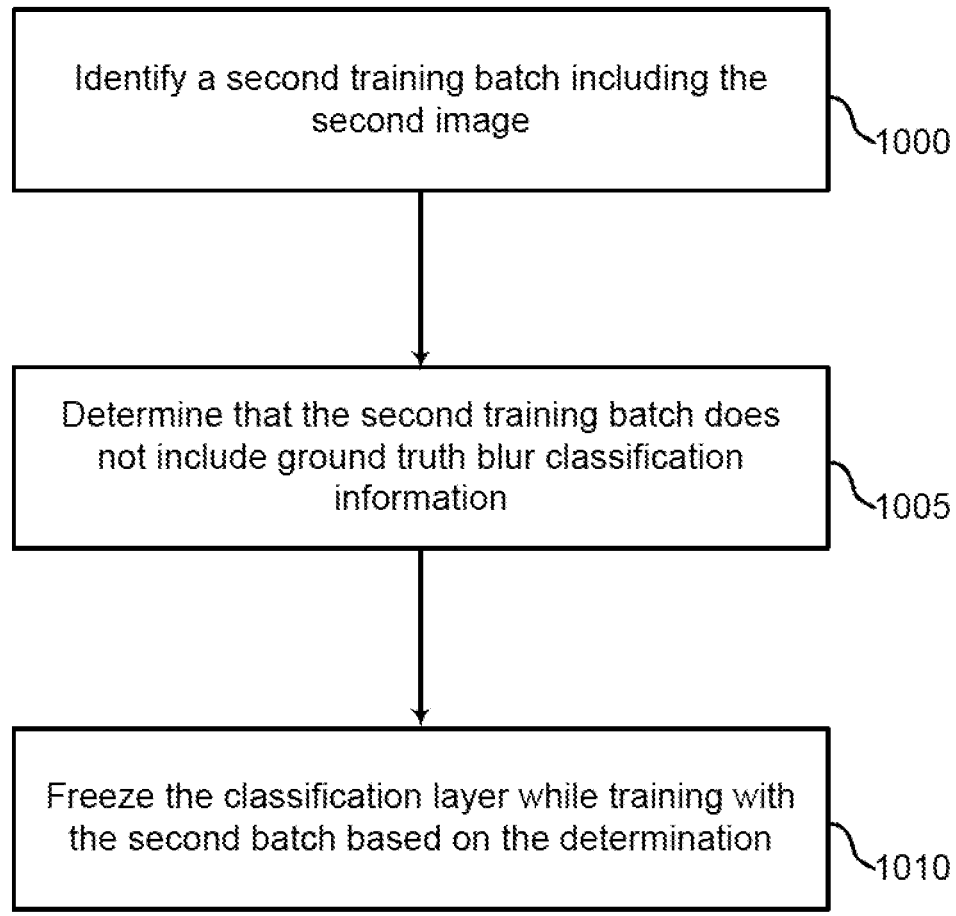
FIG. 10 shows an example of a process for freezing a classification layer during training according to aspects of the present disclosure.

FIG. 10 shows an example of a process for freezing a classification layer during training according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1000, the system identifies a second training batch including the second image. The second image includes a ground truth blur map. In some cases, the operations of this step refer to, or may be performed by, a training component as described with reference to FIG. 5.

At operation 1005, the system determines that the second training batch does not include ground truth blur classification information. In some examples, the second training batch includes exclusively ground truth blur map information or annotations. In some cases, the operations of this step refer to, or may be performed by, a training component as described with reference to FIG. 5.

At operation 1010, the system freezes the classification layer while training with the second batch based on the determination. When the system determines that a second training batch does not include ground truth blur classification information, the system freezes the classification layer while training the second training batch. In some cases, the operations of this step refer to, or may be performed by, a training component as described with reference to FIG. 5.

Figure 11:
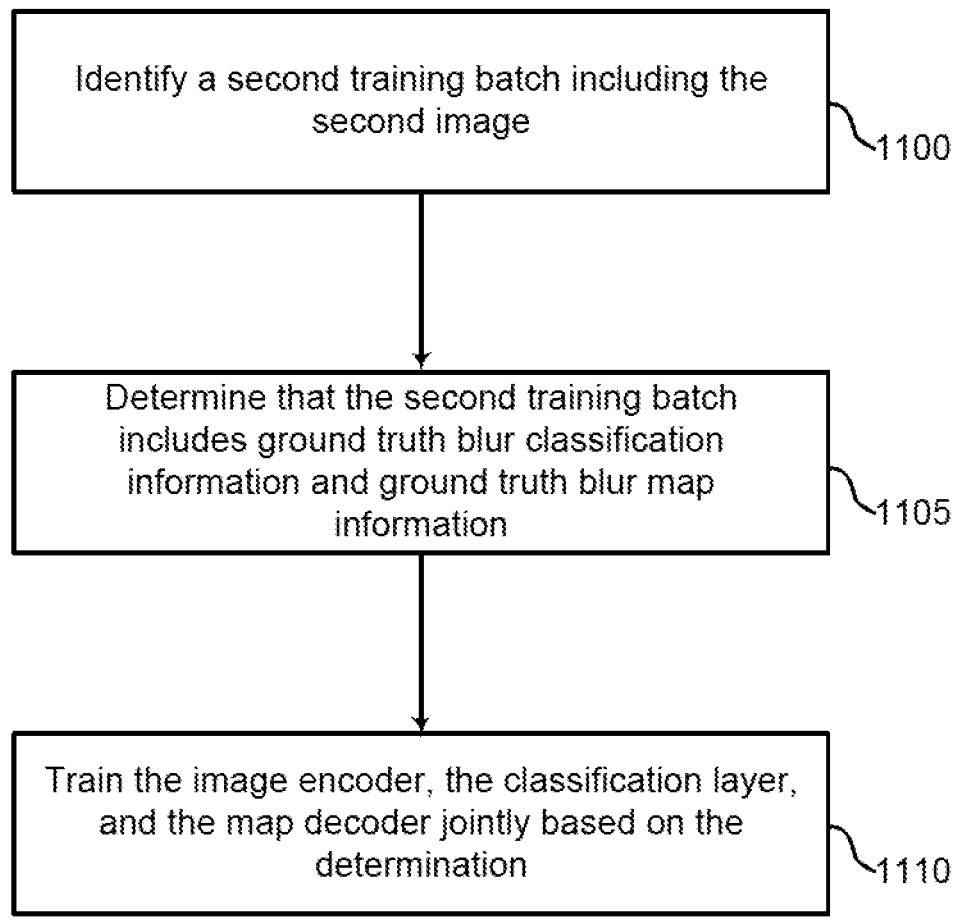
FIG. 11 shows an example of a process for jointly training components of a blur classification network according to aspects of the present disclosure.

FIG. 11 shows an example of a process for jointly training components of a blur classification network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1100, the system identifies a second training batch including the second image. In some cases, the operations of this step refer to, or may be performed by, a training component as described with reference to FIG. 5.

At operation 1105, the system determines that the second training batch includes ground truth blur classification information and ground truth blur map information. At training stage, the blur classification network uses the SmartBlur dataset. The SmartBlur dataset contains 10,000 natural photos with elaborate human annotations of both pixel-level blur amount and image-level blur desirability (e.g., global). Embodiments of the present disclosure are not limited to the SmartBlur dataset and other training datasets may also be used. In some cases, the operations of this step refer to, or may be performed by, a training component as described with reference to FIG. 5.

At operation 1110, the system trains the image encoder, the classification layer, and the map decoder jointly based on the determination. In some cases, the operations of this step refer to, or may be performed by, a training component as described with reference to FIG. 5.

Performance of apparatus, systems and methods of the present disclosure have been evaluated, and results indicate that embodiments of the present disclosure provide an improvement over existing technology. In some cases, training the blur classification network depend on a large-scale dataset with both pixel-level blur amount and image-level blur desirability annotations. However, existing datasets have a limited number of images with coarsely-annotated blur amount, and no annotations on blur desirability. Therefore, SmartBlur dataset is used, which contains 10,000 natural photos with elaborate human annotations of both pixel-level blur amount and image-level blur desirability to supervise the blur map estimation and blur desirability classification. SmartBlur dataset provides a reliable training and evaluation platform for blur analysis, and can serve as a versatile benchmark for various tasks such as blur magnification and image deblur.

To collect a large and varied set of natural photos, 75,000 images were downloaded from Flickr. Then 10,000 images were selected for further annotation. When selecting these 10,000 photos, one or more embodiments balance the number of images of different image blur desirability levels such as good blur, ok blur, bad blur, and no blur (if there is no blur in an image). Images included in the dataset have different blur types such as object motion, camera shake, and out-of-focus. These 10,000 images are captured by various camera models in different shooting conditions, and cover different scenes. Image resolution ranges from 500×300 to 1024×720.

For each image in the SmartBlur dataset, two levels of annotations are included, i.e., pixel-level blur amount and image-level blur desirability. For pixel-level blur amount annotation, each region in the image was labeled with multiple blur amounts, which include no blur, low blur, medium blur, and high blur. This is different from the existing datasets, which only indicate the pixel-level or the image-level blur existence.

In some examples, the SmartBlur dataset includes 1,822 no-blur images, 1,968 bad-blur images, 1,983 ok-blur images, and 4,177 good-blur images, therefore 10,000 images in total. These 10,000 images are randomly split into three portions (training, validation, and testing). For evaluation and validation, the same number of images are randomly selected from each blur type to balance the data of different categories.

Compared with existing datasets, SmartBlur dataset is the first dataset that has pixel-level blur amount annotations with multiple levels, e.g., from low, medium to high. SmartBlur dataset is also the first dataset that has image-level blur desirability annotation in terms of image quality. Furthermore, SmartBlur dataset is the largest blur image dataset, with all natural photos.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. An apparatus for image processing, comprising:
an image encoder configured to generate an embedded representation of an image;
a classification layer configured to predict a blur classification of the image based on the embedded representation, wherein the image encoder and the classification layer are trained based on a classification loss; and
a map decoder configured to predict a blur map of the image based on the embedded representation, wherein the image encoder and the map decoder are trained based on a map loss.

2. The apparatus of claim 1, wherein:
the image encoder comprises a plurality of levels of the image encoder, wherein each of the plurality of levels of the image encoder comprises a different resolution.

3. The apparatus of claim 2, wherein:
the map decoder comprises a plurality of levels of the map decoder, wherein each of the plurality of levels of the map decoder takes input from a different level of the levels of the image encoder.

4. The apparatus of claim 1, wherein:
the map decoder comprises a feature pyramid network (FPN).

5. The apparatus of claim 1, wherein:
the classification layer comprises a fully connected layer configured to output a plurality of values corresponding to a plurality of blur categories.

6. A method for image processing, comprising:
receiving an image comprising a plurality of regions having different blur levels;
generating an embedded representation of the image using an image encoder;
predicting a blur classification of the image based on the embedded representation using a classification layer, wherein the image encoder and the classification layer are trained based on a classification loss; and
predicting a blur map of the image based on the embedded representation using a map decoder, wherein the image encoder and the map decoder are trained based on a map loss.

7. The method of claim 6, further comprising:
determining an image quality based on the blur classification.

8. The method of claim 6, further comprising:
editing the image based on the blur map.

9. The method of claim 6, wherein:
the classification layer is not trained based on the map loss.

10. The method of claim 6, wherein:
the map decoder is not trained based on the classification loss.

11. The method of claim 6, wherein:
the blur classification comprises a plurality of probability values corresponding to different blur categories, wherein each of the different blur categories represents a global property of the image.

12. The method of claim 11, wherein:
the different blur categories include a positive category, a moderate category, a negative category, and a clear category.

13. The method of claim 6, wherein:
the blur map comprises a pixel-level indication of a blur level.

14. A non-transitory computer readable medium storing code for image processing, the code comprising instructions executable by a processor to:
receive an image comprising a plurality of regions having different blur levels;
generate an embedded representation of the image using an image encoder;
predict a blur classification of the image based on the embedded representation using a classification layer, wherein the image encoder and the classification layer are trained based on a classification loss; and
predict a blur map of the image based on the embedded representation using a map decoder, wherein the image encoder and the map decoder are trained based on a map loss.

15. The non-transitory computer readable medium of claim 14, the code further comprising instructions executable by the processor to:
determine an image quality based on the blur classification.

16. The non-transitory computer readable medium of claim 14, the code further comprising instructions executable by the processor to:
edit the image based on the blur map.

17. The non-transitory computer readable medium of claim 14, wherein:
the classification layer is not trained based on the map loss.

18. The non-transitory computer readable medium of claim 14, wherein:
the map decoder is not trained based on the classification loss.

19. The non-transitory computer readable medium of claim 14, wherein:
the blur classification comprises a plurality of probability values corresponding to different blur categories, wherein each of the different blur categories represents a global property of the image.

20. The non-transitory computer readable medium of claim 19, wherein:
the different blur categories include a positive category, a moderate category, a negative category, and a clear category.

* * * * *